United States Patent [19]

Ackley et al.

[11] Patent Number: 5,557,092
[45] Date of Patent: Sep. 17, 1996

[54] APPARATUS AND METHOD FOR 16-BIT AND NUMERIC DATA COLLECTION USING BAR CODE SYMBOLOGIES

[75] Inventors: Sprague Ackley, Seattle; Stephen Choi, Kirkland, both of Wash.

[73] Assignee: Intermec Corporation, Everett, Wash.

[21] Appl. No.: 295,382

[22] Filed: Aug. 24, 1994

Related U.S. Application Data

[63] Continuation-in-part of Ser. No. 147,376, Nov. 5, 1993, abandoned.

[51] Int. Cl.$^6$ ........................................... G06K 7/10
[52] U.S. Cl. ............................................. 235/462
[58] Field of Search .......................... 235/462, 487; 380/28, 51, 55

[56] References Cited

U.S. PATENT DOCUMENTS

| | | | |
|---|---|---|---|
| 4,079,482 | 3/1978 | Yeh | 235/487 X |
| 5,298,731 | 3/1994 | Ett | 235/494 |

FOREIGN PATENT DOCUMENTS

3330261A1 3/1985 Germany ..................... G06K 1/12

OTHER PUBLICATIONS

"Alphanumeric Data Compaction," corporate document of Intermec Corporation, Everett, WA, Nov. 13, 1989.
"Bar Code Compression Decompression," *IBM Technical Disclosure Bulletin*, Armonk, NY, May 1990, vol. 32, No. 12, pp. 288–290.
Walker, Nathan, "ASCII–Based Compaction Eases Bar-Code Decoder's Work," *Electronic Design*, Waseca, MN, Oct. 1982, vol. 30, No. 22, pp. 163–166.
The Unicode Consortium (ed.), *The Unicode Standard*, Addison–Wesley Publishing Company, Inc., Massachussetts, 1991, pp. 1–6 and 340.
Palmer, Roger C., *The Bar Code Book*, Helmer's Publishing Inc., Peterboro, New Hampshire, 1991, pp. 15–59.

*Primary Examiner*—Donald T. Hajec
*Assistant Examiner*—Jeffrey R. Filipek
*Attorney, Agent, or Firm*—Seed and Berry LLP

[57] ABSTRACT

A method for converting characters represented by a 16-bit character encoding standard or a numeric string into bar code symbols computes three values for the 16-bit code or numeric string. These three values are encoded into three bar code codes. Counts associated with the bar code codes are retrieved, along with character font data. Both the bar code symbols and the human-readable characters are printed on a bar code label. The printing apparatus includes a central processing unit for performing the above method, intercoupled with a bar code printer, memory, and secondary storage. A bar code reader similarly includes a central processing unit intercoupled with memory, secondary storage, and a bar code reader. This bar code reader scans the bar code symbols and decodes them into standard bar code codes. Groups of three codes are converted into three numeric values. The hexadecimal equivalent of these three numeric values is computed. The particular character represented by this hexadecimal value is retrieved from a 16-bit character encoding standard. The character, or the hexadecimal value of the character, is output for use in other applications.

20 Claims, 10 Drawing Sheets

| Step 110 | Step 112 | Step 114 | Step 116 | | |
|---|---|---|---|---|---|
| The Kanji Character in Ideograph | The Character in JISC 6226-1993 code in Hex | JIS code in decimal = $43^2(X) + 43(Y) + (Z)$ | Code 93 for X | Code 93 for Y | Code 93 for Z |
| 情 | 3E70 | 15,984 = $43^2(8) + 43(27) + (31)$ | "8" value=8 | "R" value=27 | "V" value=31 |
| 報 | 4A73 | 19,059 = $43^2(10) + 43(10) + (10)$ | "A" value=1 | "D" value=13 | "A" value=10 |
| 事 | 3B76 | 15,222 = $43^2(8) + 43(10) + (0)$ | "8" value=8 | "A" value=10 | "0" value=0 |
| 業 | 3648 | 13,896 = $43^2(7) + 43(22) + (7)$ | "7" value=7 | "M" value=22 | "7" value=7 |

| Step 110 | Step 112 | Step 114 | Step 116 | | |
|---|---|---|---|---|---|
| The Kanji Character in Ideograph | The Character in JISC 6226-1993 code in Hex | JIS code in decimal = $43^2(X) + 43(Y) + (Z)$ | Code 93 for X | Code 93 for Y | Code 93 for Z |
| 情 | 3E70 | $15,984 =$ $43^2(8) + 43(27) + (31)$ | "8" value=8 | "R" value=27 | "V" value=31 |
| 報 | 4A73 | $19,059 =$ $43^2(10) + 43(10) + (10)$ | "A" value=1 | "D" value=13 | "A" value=10 |
| 事 | 3B76 | $15,222 =$ $43^2(8) + 43(10) + (0)$ | "8" value=8 | "A" value=10 | "0" value=0 |
| 業 | 3648 | $13,896 =$ $43^2(7) + 43(22) + (7)$ | "7" value=7 | "M" value=22 | "7" value=7 |

| | Step 152, 154 | | Step 156 | Step 156 | Step 160 |
|---|---|---|---|---|---|
| Code 93 X | Code 93 for Y | Code 93 Z | JIS code in decimal = $43^2(X) + 43(Y) + (Z)$ | The Character in JISC 6226-1993 code in Hex | The Kanji Character in Ideograph |
| "8" value=8 | "R" value=27 | "V" value=31 | $43^2(8) + 43(27) + (31) =$ 15,984 | 3E70 | 計 |
| "A" value=1 | "D" value=13 | "A" value=10 | $43^2(1) + 43(13) + (10) =$ 19,059 | 4A73 | 辞 |
| "8" value=8 | "A" value=10 | "0" value=0 | $43^2(8) + 43(10) + (0) =$ 15,222 | 3B76 | 電 |
| "7" value=7 | "M" value=22 | "7" value=7 | $43^2(7) + 43(22) + (7) =$ 13,896 | 3648 | 業 |

5,557,092

APPARATUS AND METHOD FOR 16-BIT AND NUMERIC DATA COLLECTION USING BAR CODE SYMBOLOGIES

CROSS REFERENCE TO RELATED APPLICATIONS

This application is a continuation-in-part of application Ser. No. 08/147,376, filed Nov. 5, 1993, entitled Apparatus and Method for 16-Bit Data Collection Using Bar Code Symbologies, now abandoned.

TECHNICAL FIELD

This invention relates to devices and methods for reading or printing bar code symbols representing characters in character encoding standards or large strings of numbers.

BACKGROUND OF THE INVENTION

Bar code symbologies are widely used for data collection. Bar code symbols were originally developed to support numeric data entry. For example, the bar code symbologies known as UPC, EAN, Code 11 and Codabar are all bar code symbology standards which support only numeric characters, and a few special characters such as "+" and "−". The bar code standard Code 39 was the first alphanumeric bar code symbology standard developed. However, it was limited to 43 characters.

Code 93 is an improvement over Code 39. Code 93 is a continuous bar code symbology employing four element widths. An element is a single bar or a single space, thus in Code 93, each element may have one of four widths. Each Code 93 symbol has nine modules that may be either black or white (either a bar or a space). A module is the narrowest nominal width unit of measure in a bar code standard. Each symbol in the Code 93 standard contains three bars and three spaces (six elements), whose total length is nine modules long. Code 93, having nine modules and three bars per symbol is referred to in the industry as a (9,3) symbology. The Code 93 standard defines 48 unique symbols, and thus is able to define 47 characters in its character set plus a start/stop code. The 47 characters include the numeric characters 0–9, the alphabetic characters A–Z, some additional symbols and four shift codes.

The computer industry uses its own character encoding standards, namely, the American Standard Code for Information Interchange (ASCII). ASCII defines a character set containing 128 characters and symbols. Each character in ASCII is represented by a unique 7-bit code. Since Code 39 and Code 93 are limited to fewer than 50 characters, these standards are inadequate to uniquely represent each ASCII character. The four shift codes in Code 93, however, allow this standard to unambiguously represent all 128 ASCII characters. One drawback is that a series of two Code 93 symbols are required to represent a single ASCII character. Thus, bar code labels representing characters in the ASCII character set are twice as long as labels representing characters in the Code 93 character set.

New bar code symbology standards, such as Code 128, were developed to encode the complete ASCII character set, however, these standards suffer from certain shortcomings, including requiring shift codes or other preceding symbols to represent certain characters. All of these symbologies require increased processing time and overhead to process the entire ASCII character set.

The computer industry has grown beyond the limits of the ASCII character set. As the computer markets have grown, the need to support additional languages not defined by the ASCII character set has also arisen. New character sets were developed to accommodate clusters of characters in related languages. The original 7-bit ASCII character set was expanded to 8-bits thus providing an additional 128 characters or data values. This additional 128 set of data values (the "upper 128") allowed for additional characters present in the related romance languages (i.e., French, German, Spanish, etc.) to be represented.

As the computer markets grew internationally, however, even more languages were required to be included in the character set. Particularly, the Asian markets demanded a character set, usable on computers, which supported thousands of unique characters. To uniquely define each of these characters, a 16-bit encoding standard was required.

Several 16-bit encoding standards such as Unicode, JISC 6226-1983, and others have recently been developed. The Unicode character encoding standard is a fixed-length, uniform text and character encoding standard. The Unicode standard may contain up to 65,530 characters, and currently contains over 28,000 characters mapping onto the world's scripts, including Greek, Hebrew, Latin, Japanese, Chinese, Korean, and Taiwanese. The Unicode standard is modeled on the ASCII character set. Unicode character values are consistently 16 bits long, regardless of language, so no escape sequence or control code is required to specify any character in any language. Unicode character encoding treats symbols, alphabetic characters, and ideographic characters identically, so that they can be used in various computer applications simultaneously and with equal facility. Computer programs using Unicode character encoding to represent characters, but which do not display or print text, can remain unaltered when new scripts or characters are introduced.

New computer operating systems are beginning to support these comprehensive 16-bit code standards, e.g., WINDOWS NT™, manufactured by Microsoft Corporation of Redmond, Wash. The data collection industry, however, has failed to keep pace with the computer industry. No system currently exists for readily encoding the 16-bit computer character codes into bar code symbols. Therefore, there is a need to support these 16-bit computer character standards in the data collection industry, particularly for bar code symbologies.

Furthermore, most alphanumeric bar code symbologies are inefficient when used to encode a long series of numbers. When encoding a series of decimal numbers using Code 93 for example, the 26 bar code symbols reflecting the 26 alphabetic characters are not used. Therefore, there is a need to allow these alphanumeric bar code symbologies to more efficiently represent a long series of numbers.

SUMMARY OF THE INVENTION

The present invention solves the above problems by encoding characters represented by 16-bit encoding standards into a standard bar code symbology. A method is described for decoding bar code symbols representing 16-bit characters into human-readable characters, and vice versa. The present invention allows international characters to be encoded and printed onto bar code labels, which may later be read by bar code readers.

In the method of encoding characters represented by character codes having at least 16 bits into bar code symbols, the present invention performs the steps of: determining a character code for a selected character; computing first, second and third numeric values from the character code; converting each of the first, second and third values into corresponding bar code codes; retrieving bar code symbol print data, or counts, corresponding to the bar code codes; and, printing the bar code symbols. The Code 93 standard is the preferred bar code symbology used in the present invention. When using the Code 93 standard, the three numeric values are determined based on the following equation: $43^2 (X)+43(Y)+(Z)=$[16-bit code in decimal]. The values X, Y, and Z are values between 0 and 42.

The human-readable characters are also preferably printed with the bar code symbols onto a bar code label. Therefore, font data necessary for printing the characters is also retrieved prior to printing the bar code label. An apparatus for performing the above encoding method includes a central processing unit intercoupled with memory, secondary storage, and a bar code label printer.

In performing the method of decoding bar code symbols into characters, the present invention performs the steps of: reading the bar code symbols, decoding the bar code symbols into corresponding bar code codes, converting the bar code codes to numeric values, and computing 16-bit codes from the numeric values. The characters corresponding to each 16-bit code are then determined. An apparatus for performing the above decoding method includes a central processing unit intercoupled with memory, secondary storage, and a bar code symbol reader.

In a first alternative embodiment, the above encoding steps are performed for encoding characters represented by character codes each having at least 8 bits into bar code symbols. In a second alternative embodiment, the present invention encodes characters represented by a 16-bit encoding standard into a unique bar code symbology created to uniquely represent each 16-bit code by a bar code symbol. The method of the second alternative embodiment performs the steps of: determining a character code having at least 16 bits for a selected character, converting the character code to a bar code, and printing a bar code symbol corresponding to the bar code code. The step of converting the 16-bit character code to a bar code code includes the step of retrieving the bar code code from a look-up table. The converse methods are performed for reading a bar code symbol printed by these alternative embodiments.

In a third alternative embodiment, the present invention efficiently encodes numeric strings into bar code symbols. The method of the third alternative embodiment performs the steps of: computing at least first, second and third values from a selected numeric string, the selected numeric string having at least five digits; converting each of the first, second and third values into a corresponding bar code code; and printing a bar code symbol corresponding to each of the bar code codes.

Other features and associated advantages of the present invention will become apparent from studying the following detailed description together with the accompanying drawings.

DETAILED DESCRIPTION OF THE PRESENTLY PREFERRED EXEMPLARY EMBODIMENT

As used generally herein, the following definitions apply: "characters" refers to human-readable characters, including symbols, numeric characters, alphabetic characters, and ideographic characters; "numeric string" refers to a sequence of numeric characters, typically decimal digits; "16-bit code" or "16-bit character code" refers to a hexadecimal or decimal representation of a character in a 16-bit character encoding standard, such as Unicode; "bar code symbology" refers to a set of machine-readable or bar code symbols for uniquely representing a set of characters; "bar code standard" refers to a bar code symbology recognized by, or regularly used in, an industry (e.g., Code 93); "bar code code" refers to a code representing a character in a bar code symbology; "bar code symbol" refers to the unique geometric shapes or bar and space patterns used in a bar code symbology to represent particular characters; and, "counts" refers to a unique set of electrical signals necessary for printing, or produced when reading, a bar code symbol corresponding to a character in a bar code symbology.

For example, in the 16-bit character encoding standard Unicode, the character "A" is represented by the 16-bit code "0041" in hexadecimal notation and "65" in decimal. The character "A" has a bar code code of "10" in the bar code standard Code 93. The bar code code 10 in Code 93 corresponds to a bar code symbol having a pattern of a two module width bar followed by: a single module width space, a single module width bar, a single module width space, a single module width bar, and a three module width space.

The counts associated with the printing of this symbol are generally unique to each printer, and for a thermal printer, would represent the time intervals between transitions between bars and spaces to appropriately activate the printer's heating element as the thermal sensitive paper moved past it.

Figure 1:
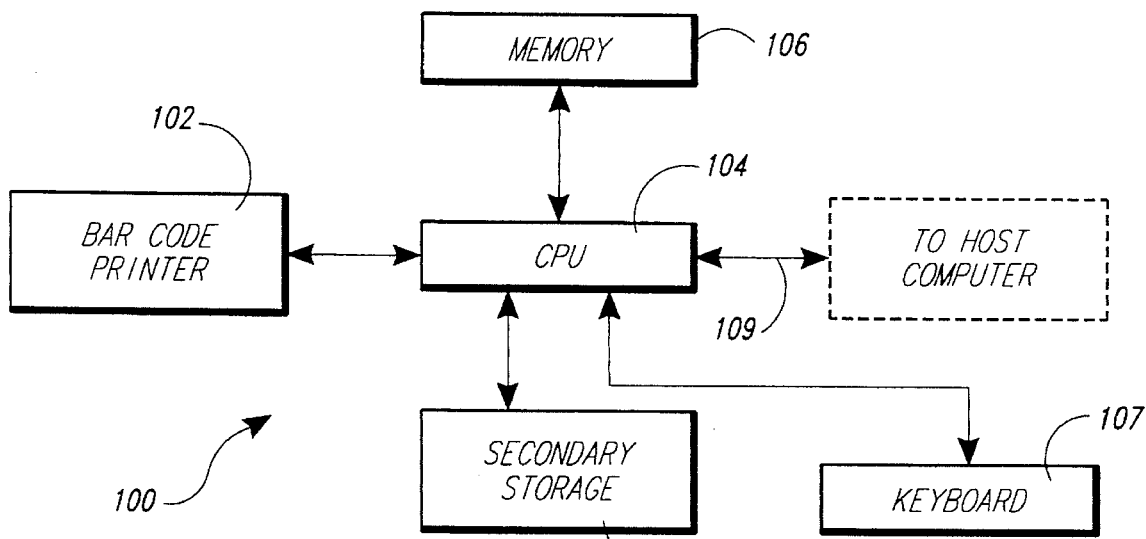
FIG. 1 is a block diagram of a bar code symbol printing apparatus of the present invention.

FIG. 1 shows a bar code symbol printing apparatus 100 of the present invention. The apparatus consists of a bar code printer 102, a central processing unit (CPU) 104, a memory 106, a keyboard 107 and a secondary storage 108. The bar code printer 102 is of a type generally known which can print bar codes and human-readable characters. Those skilled in the art may select from any such bar code printers which is suitable for use in the present invention. The CPU 104 is electrically coupled to a host computer, or other apparatus or applications, by a port or line 109. The CPU 104, executing appropriate instructions stored in the memory 106 and/or the secondary storage 108, converts a 16-bit character code into counts which are sent to the bar code printer 102. The bar code printer 102 interprets these counts and converts them into printed bar code symbols, typically in the form of a bar code label. A bar code label generally refers to any paper, cloth, plastic, metal or other pliable or rigid material suitable for having bar code symbols and/or characters printed thereon. Those skilled in the relevant art, however, will recognize that the term bar code label also refers to any bar code symbols printed on an object, such as packaging for a consumer product.

Figures 3, 9:
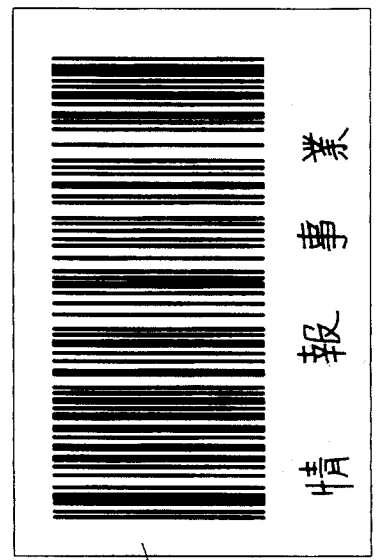
FIG. 3 is a table showing an example of the intermediate values determined during the steps shown in the flow chart of FIG. 2.
FIG. 9 is an example of a label having bar code symbols with human-readable characters printed or read by the present invention.

The printed bar code label preferably includes both bar code symbols and the corresponding human-readable characters. An example of a label 101 printed or read under the present invention is shown in FIG. 9. In the preferred embodiment, a standard 16-bit character encoding standard is used by the present invention, for example, Unicode, JISC-6226-1983, Big Five (BF), or KSC 5609-1987. Furthermore, in the preferred embodiment, a standard bar code symbology is used to represent a character in a 16-bit encoding standard. The preferred bar code standard is Code 93.

Three Code 93 bar code symbols are necessary to uniquely represent each character in a 16-bit character encoding standard. Since the Code 93 standard is a continuous symbology and employs nine modules per character, a total of 27 modules are necessary to encode one 16-bit code. Consequently, the Code 93 standard is preferred in the present invention because it permits high bar code density, i.e., a large number of data characters represented in a linear unit of measure. The Code 93 standard is currently used and recognized; therefore, applications for its use exist, facilitating wide data exchange throughout the industry. Additionally, the Code 93 standard provides for high data security (i.e., error detection).

Figure 2:
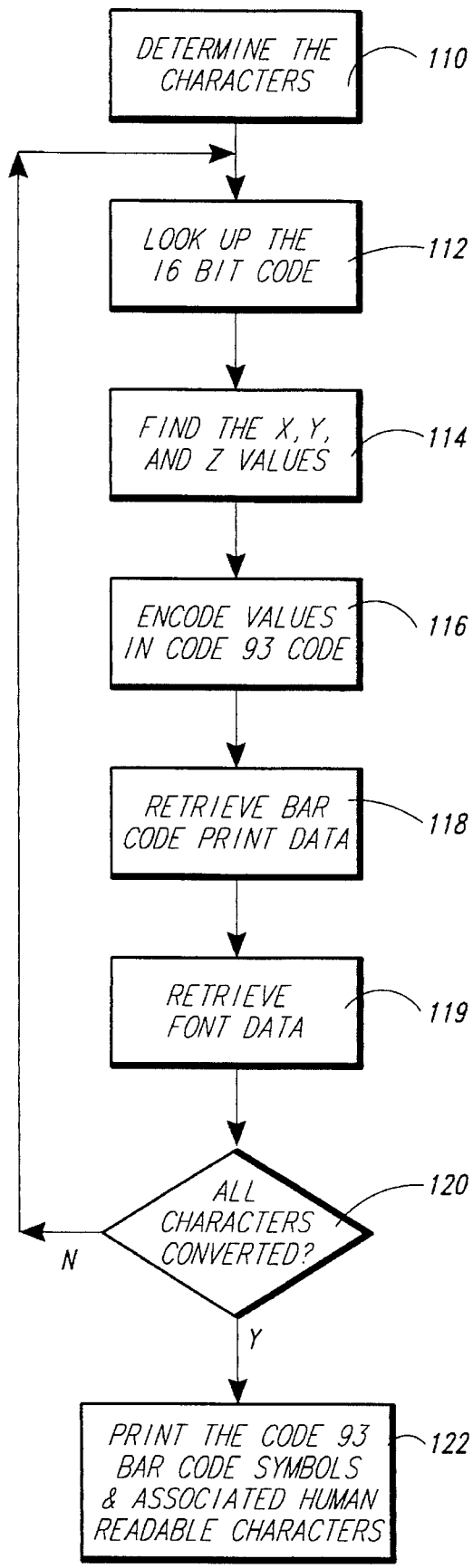
FIG. 2 is a flow chart showing the basic steps performed by the printing apparatus of FIG. 1 for printing bar code symbols representing 16-bit character codes.

FIG. 2 shows the steps performed by the printing apparatus 100 of FIG. 1 for printing a bar code label having both bar code symbols and human-readable characters. In step 110, a string of characters are selected, input or determined, for example, such as by input using the keyboard 107. The string of characters may also be input to the CPU 104 over the line 109 from the host computer. When a key is depressed on the keyboard 107, the keystroke is converted into a "scan code" which is transmitted from the keyboard to the device to which the keyboard is connected (e.g., the printing apparatus 100 or the host computer). This scan code represents the particular key on the keyboard which has been depressed, and is unrelated to any particular character or code in a character set, such as ASCII or Unicode.

In step 112, the unique 16-bit code for the first character is determined or retrieved. The CPU 104, for example, translates the scan code input from the keyboard into the unique 16-bit code for the particular character selected by the key depression. In 16-bit character encoding standards, the 16-bit codes are often represented as hexadecimal numbers. For computational purposes, these hexadecimal numbers are preferably converted to their decimal equivalents. The CPU 104 retrieves the 16-bit code from the memory 106. In the preferred embodiment, the memory, 106 contains the 16-bit codes for all characters in the 16-bit character encoding standard.

Each character may also be input to the CPU over the line 109 in its corresponding 16-bit code. If the 16-bit code for a character is input to the CPU 104 over the line 109, the CPU need not access any memory to determine the unique 16-bit code for the character.

The 16-bit code representing a character is converted into three bar code codes, i.e., each 16-bit code in the Unicode encoding standard is represented by three Code 93 codes. By using three Code 93 codes, up to 79,507 unique characters may be represented using the following equation:

$$43^2(X)+43(Y)+(Z)=[\text{16-bit code in decimal}] \quad (1)$$

where the variables X, Y, and Z are numeric values between 0 and 42. Since the above equation may represent more than 79,000 unique characters, this equation will more than adequately represent the over 28,000 characters in the Unicode standard. Moreover, the above equation can represent the total 65,530 characters that can be encoded under the Unicode standard.

The CPU 104, in step 114, solves equation (1) using known methods, such as those explained below. In other words, the CPU 104 computes three numeric values between 0 and 42 for the variables X, Y, and Z in the above equation so as to represent the decimal equivalent of the 16-bit code.

In step 116, the CPU 104 encodes each numeric value of the variables X, Y, and Z into a corresponding one of the Code 93 bar code codes. In Code 93, the bar code codes 0 through 42 represent the characters 0–9, A–Z, "–", ".", "space", "$", "/", "+", and "%", respectively. Bar code codes 43 through 47 represent the four shift codes and the stop code.

In step 118, the CPU 104 retrieves the counts for printing the bar code symbols representing each of the three Code 93 bar code codes. The counts for Code 93 start and stop codes are also retrieved. Since the Code 93 standard is used, the memory 106 or the secondary storage 108 needs to store only the 48 Code 93 bar code codes and corresponding counts. Most applications or apparatus using the Code 93 standard have these codes and counts readily available.

In the preferred embodiment, the three Code 93 bar code symbols representing a 16-bit code are also printed with the human-readable character represented by the 16-bit code. Therefore, in step 119, the CPU 104 retrieves the character font data necessary for printing the characters. The font data provides the printer 102 with particular data necessary to print the unique character represented by the three Code 93 bar code symbols. With a dot matrix-type printer (not shown), the font data instructs the printer how to print the unique character. The font data is stored in either the memory 106 or the secondary storage 108.

In step 120, the CPU 104 determines whether all characters in the string initially selected in step 110 have been converted. If additional characters remain in the string, then the unique 16-bit code for the next character is found in step 112, the three numeric values of variables X, Y, and Z are computed in step 114, the three numeric values are encoded into three Code 93 bar code codes in step 116, and the particular font and bar code symbol counts are retrieved in step 118. This process is repeated until all of the characters have been converted. Thereafter, in step 122, the bar code is printed by the printer with both the three Code 93 bar code symbols, and the associated human-readable characters.

FIG. 3 is a table showing an example of converting characters into bar code symbols. The table shows four kanji characters converted and printed by the printing apparatus 100 into the Code 93 bar code label 101 shown in FIG. 9. In English, these characters mean "information industry." Taking the character in the first row, the CPU 104 retrieves this character's 16-bit code in step 112 of FIG. 2. In the JISC-6226-1983 standard, its 16-bit code is "3E70" in hexadecimal notation. The decimal equivalent of this hexadecimal value is 15,984.

The JISC-6226-1983 standard is the Japan Industrial Standard Character set, mapping the kanji and katakana characters into 16-bit codes. This character standard is similar to Unicode, which, as noted above, includes the kanji and katakana characters, among others. However, each character in the JISC-6226-1983 standard is assigned a different 16-bit code for the equivalent character in the Unicode standard. Therefore, this example is similar for Unicode characters, except, the 16-bit codes corresponding to particular characters differ.

In step 114 of FIG. 2, solving the equation $43^2(X)+43(Y)+(Z)=15,984$ for the first character of the table of FIG. 3, the CPU 104 computes the values for variables X, Y, and Z. That is, X is computed to be equal to 8, Y equal 27, and Z equal 31. In step 116, the CPU 104 converts these three numeric values to their corresponding Code 93 bar code codes. That is, 8 is converted to its corresponding bar code code of "8," 27 converted to its corresponding bar code code of "R", and 31 to its corresponding bar code code of "V" in the Code 93 character set. The CPU 104 determines the counts for printing the Code 93 bar code symbols for "8", "R" and "V" in step 118. The CPU 104 also determines the font data for printing the corresponding human-readable characters in step 119. The steps 112 through 119 are repeated for the next three kanji characters, as shown in the next three rows in FIG. 3. Thereafter, the printer 102 prints the bar code symbols and corresponding characters for all four kanji characters in step 122. Alternatively, the bar code counts and font data may be printed after each kanji character is converted using the method herein. The resulting label 101 having Code 93 bar code symbols, with human-readable characters, is shown in FIG. 9.

Those skilled in the art will recognize that other bar code standards may be used for representing 16-bit codes. For example, the alphanumeric bar code standards Code 39, Code 128, Code 49, Code 16K, and others may be used. Two-dimensional bar code standards such as Code One and PDF417 may also be used based on the detailed description provided herein. As those skilled in the art will recognize, each bar code standard has its particular benefits and shortcomings.

Figure 4:
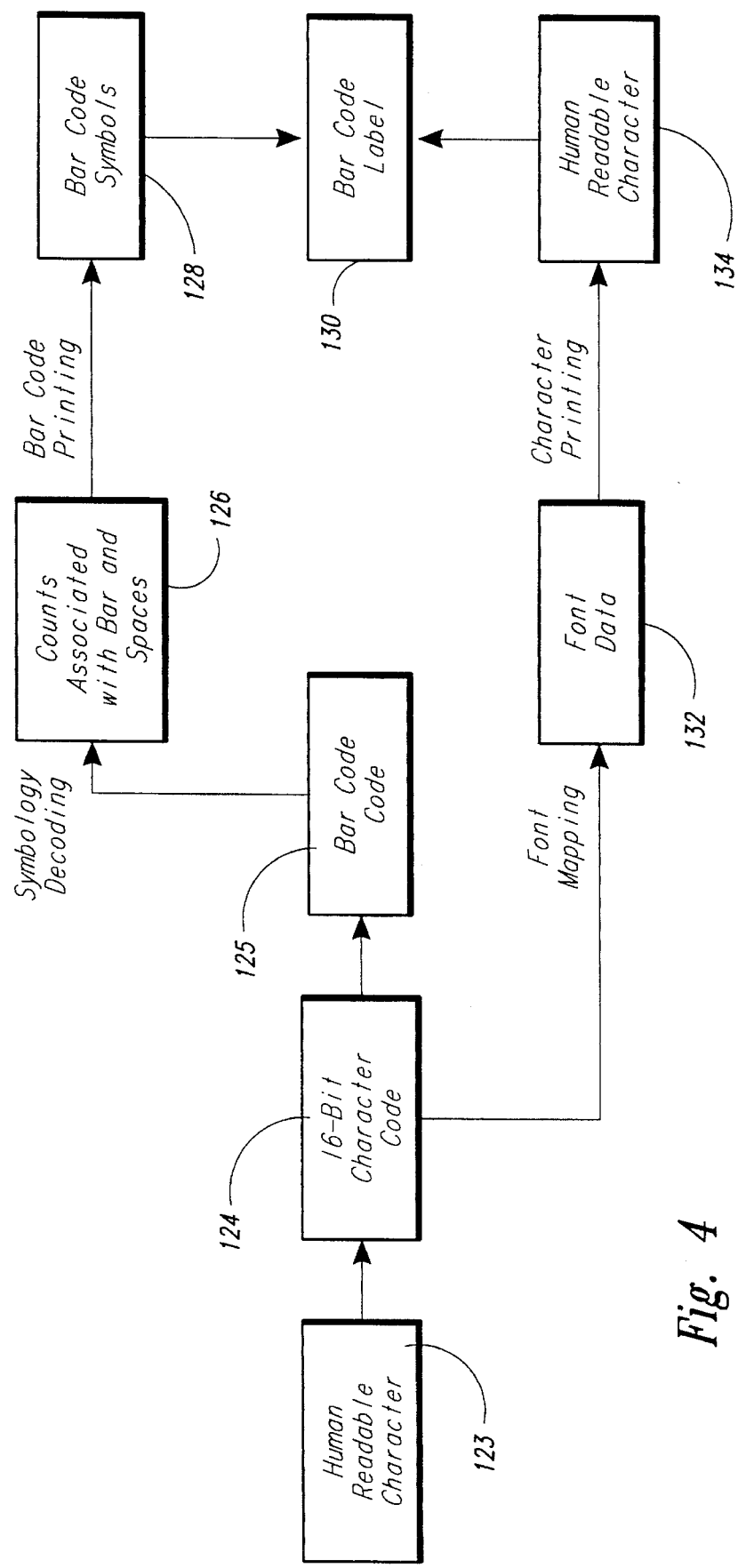
FIG. 4 is a data transformation diagram showing the transformation of data from characters to bar code symbols printed by the apparatus of FIG. 1.

FIG. 4 shows the transformation of a character into a bar code label having both bar code symbols and human-readable characters, by using the steps shown in FIG. 2. The transformation begins with a selected character (block 123). The character is converted to a 16-bit code, assigned by a 16-bit encoding standard (block 124). The 16-bit code for the character is converted into a bar code code (block 125). In the Code 93 standard, the equation (1) above is used to break the 16-bit code into three Code 93 bar code codes. These three bar code codes are then converted into the counts representing the bars and spaces necessary for bar code symbol priting (block 126). The counts associated with the bar and spaces are then printed as Code 93 bar code symbols (block 128) to produce the bar code label (block 130).

Each corresponding human-readable character is also printed with the bar code symbols. As described herein, each 16-bit code represents a unique character. The 16-bit code is mapped onto the font data necessary for printing the unique character (block 132). The font data is then printed as human-readable characters (block 134) to produce the bar code label (block 130). For example, if the characters are printed on a dot matrix primer, then the font data is the appropriate signals to drive the dot matrix primer so as to print the character. This character is printed together with the Code 93 bar code symbols (i.e., block 128) on the completed bar code label (block 130), as shown in FIG. 9. The counts and font data are stored as each character is converted, and then the entire label is primed after all characters have been converted. Alternatively, the bar code symbols and characters are printed sequentially as each human-readable character is transformed into printed bar code symbols and characters on the bar code label.

Figure 5:
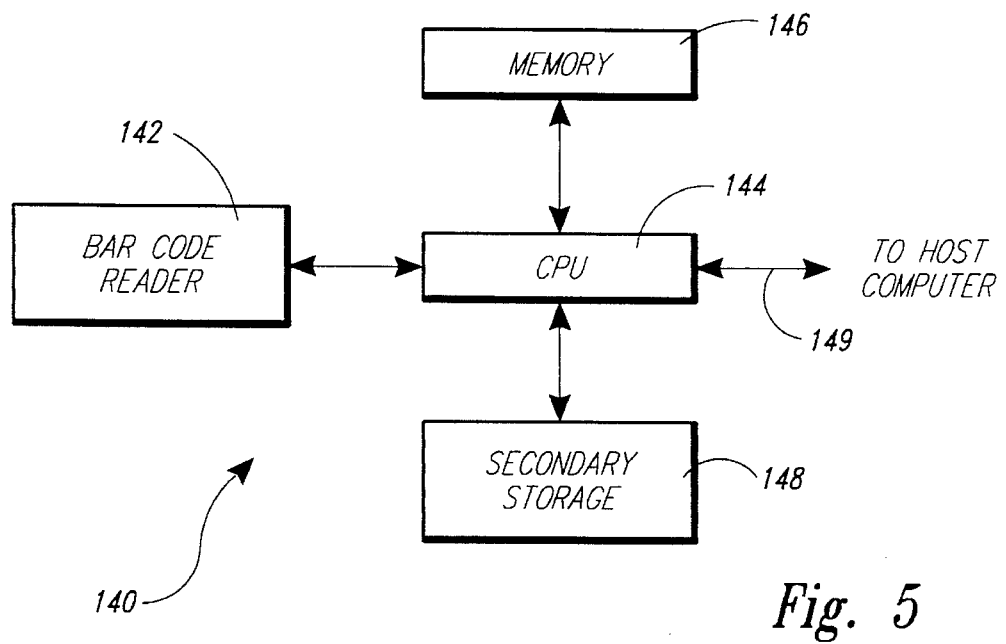
FIG. 5 is a block diagram of a bar code symbol reading apparatus of the present invention.

FIG. 5 shows a bar code reading apparatus 140 of the present invention for reading the bar code symbols printed by the printing apparatus 100. The bar code reading apparatus 140 has a standard bar code reader 142. Bar code readers are known by those skilled in the art, and any such reader suitable for use in the present invention may be selected for use. The data read from the bar code reader 142 is input to a central processing unit (CPU) 144. A memory 146 and a secondary storage 148 are coupled to the CPU 144. The data input from the bar code reader 142 is processed by the CPU 144 and output to a host computer, or other apparatus or applications, by a port or line 149.

Figure 6:
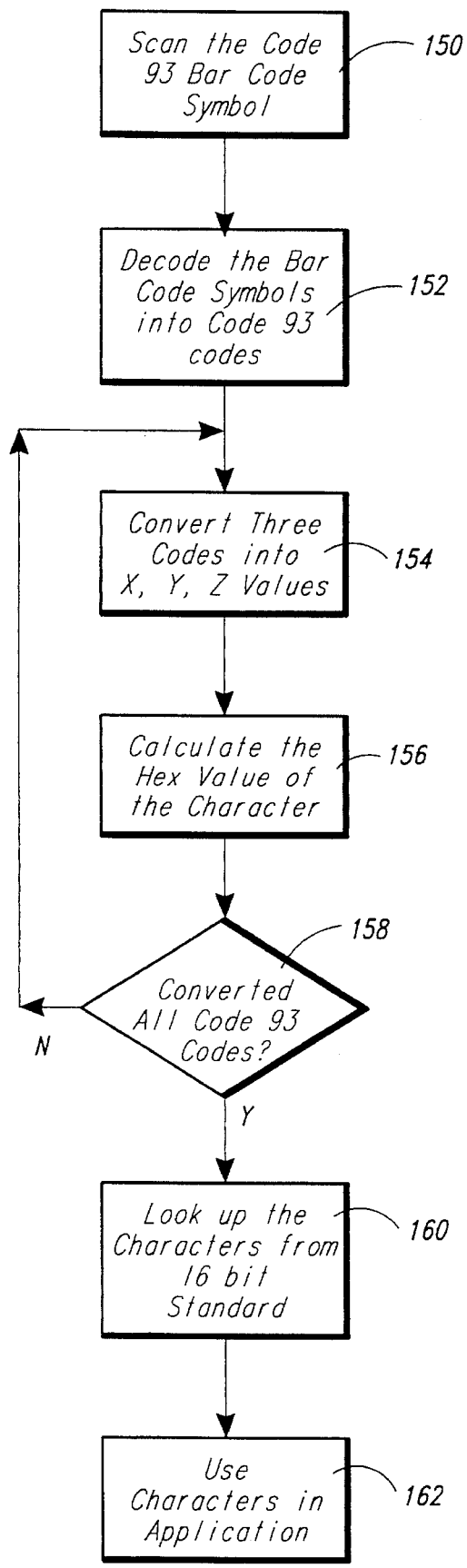
FIG. 6 is a flow chart showing the basic steps performed by the reading apparatus of FIG. 5 for reading bar code symbols representing 16-bit character codes.

FIG. 6 shows the steps performed by the bar code reading apparatus 140 of FIG. 5 for reading bar code symbols. In step 150, the bar code reader 142 scans the bar code symbol of a label and determines a series of counts. As is known by those skilled in the art, the transitions between bars in the bar code symbol, together with the timer within the reading apparatus, determines the counts of the bar code symbol read. In step 152, the CPU 144 converts the bar code symbol into a string of bar code codes, i.e., the counts are converted into a string of Code 93 bar code codes. In step 154, the CPU 144 determines the first set of three numeric values for the first three Code 93 bar code codes. In the Code 93 standard, each character in the character set corresponds to a bar code code having a numeric value between 0 and 42(e.g., the character "A" in the set has a value of "10").

In step 156, the CPU 144 computes the hexadecimal equivalent of this set of three numeric values based upon the equation (1) above, where the variables X, Y, and Z represent the three numeric values corresponding to the three bar code codes. For a given label having several bar code symbols, the first, second, and third symbols scanned are converted into numeric values of variables X, Y, and Z, respectively. In this step 156, the computed decimal value of the 16-bit code is also converted into its hexadecimal equivalent.

In step 158, the CPU 144 determines whether all of the Code 93 codes, in sets of three, have been converted into their hexadecimal equivalent. If not, then the three numeric values are determined for the next three Code 93 codes (step 154), these three numeric values are input to the equation (1) above as variables X, Y, and Z and the hexadecimal equivalent of the result is computed (step 156). This process is repeated until all of sets of three bar code codes, decoded from the scanned label, are converted into their hexadecimal equivalents.

Thereafter, in step 160, the CPU 144 converts each hexadecimal value computed above to its corresponding character. The CPU 144 retrieves the character from either the memory 146 or the secondary storage 148 depending upon where the required data is stored. In step 162, the characters are then displayed, used in other applications by the CPU 144, or output over the line 149. Alternatively, the CPU 144 skips step 160 and outputs the hexadecimal values over the line 149 to a host computer which performs the conversion into the corresponding characters.

One or more of the shift code characters in the Code 93 bar code standard must precede the Code 93 bar code symbols representing 16-bit codes. The preceding shift codes instruct the bar code reading apparatus 140 that the subsequent bar code symbols represent 16-bit codes. Absent the preceding shift code or codes, the bar code symbols are simply read as Code 93 bar code symbols. Characters in the Code 93 standard and Unicode characters may thus be encoded together in a single bar code label if the Unicode characters are separated from the Code 93 characters by the appropriate shift codes. The printing apparatus 100 described herein must also print the appropriate shift codes before printing the bar code symbols representing 16-bit codes.

Figures 7, 8:
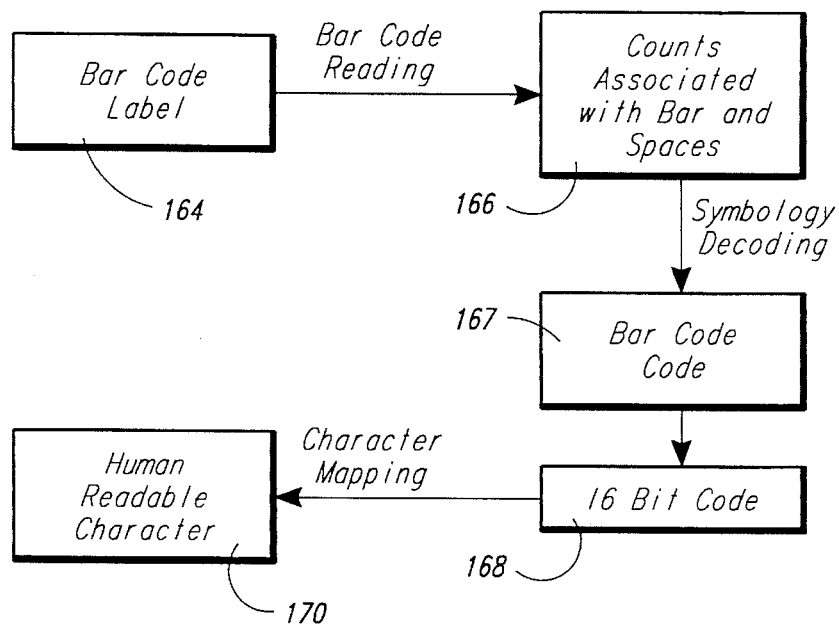
FIG. 7 is a table showing an example of the intermediate values determined during the steps shown in the flow chart of FIG. 6.
FIG. 8 is a data transformation diagram showing the transformation of data from bar code symbols read by the apparatus of FIG. 5 into characters.

FIG. 7 is a table showing an example of converting bar code symbols into characters. In the table, the bar code symbols shown in the label 101 are read by the bar code reader 140 and the steps in FIG. 6 are performed to convert these symbols into kanji characters. In step 150 of FIG. 6, the bar code reader 140 scans the bar code label 101 and the counts for each bar and space are determined. Because the bar code label 101 is encoded in the Code 93 standard, each set of three bars and three spaces represents a Code 93 bar code code. In step 152, the CPU 144 decodes the first three bar code symbols into Code 93 bar code codes. In step 154, the CPU 144 determines the numeric value for each bar code code. The first bar code symbol (i.e., the first three bars and three spaces) has a bar code code representing the character "8", which corresponds to the numeric value 8 in the Code 93 standard. The second bar code code is decoded into the character "R", which corresponds to numeric value 27. The third bar code code is decoded into the character "V", which corresponds to the numeric value 31.

In step 156 of FIG. 6, these three numeric values are input to the equation (1) where the first numeric value is the variable X, the second numeric value is the variable Y, and the third numeric value is the variable Z. For the first three numeric values shown in the example of FIG. 6, the equation (1) becomes $43^2(8)+43(27)+(31)=15,984$.

In step 156 of FIG. 6, the CPU 144 also computes the hexadecimal equivalent of this decimal number. The hexadecimal equivalent of the decimal number 15,984 is 3E70. In the step 160, the CPU 144 retrieves from the memory 146 or the secondary storage 148 the kanji character corresponding to this hexadecimal number, and outputs it for use in any appropriate application in step 162.

Steps 152–162 are performed for the next nine Code 93 bar code symbols in the label 101, and each set of three Code 93 bar code symbols and bar code codes is converted to its corresponding kanji character. The above steps may also be first performed for all Code 93 bar code symbols and the results stored in the memory 146. Thereafter, all of the corresponding kanji characters are output together.

FIG. 8 shows the transformation of a bar code label into a character or string of characters, by using the steps shown in FIG. 6. The transformation begins with a bar code label having several bar code symbols (block 164), such as the label 101. The label 101 is read and the counts associated with the bars and spaces of this label are determined by the bar code reader 142 and the CPU 144 (block 166). The counts are converted into bar code codes based on a bar code standard. For example, using the Code 93 standard described herein, each set of three bars and three spaces is converted into a Code 93 bar code code (block 167). Each set of three bar code codes are then converted into a 16-bit code, for example, by using the equation (1) above (block 168). The 16-bit code is mapped to its corresponding unique human-readable character (block 170). The character is then output by the CPU 144 for use in any appropriate application (e.g., displayed on a computer screen.)

In a first alternative embodiment, the present invention is adapted to encode characters represented by 8-bit character encoding standards (e.g., extended ASCII) into standard bar code symbols, and then read these symbols. Only two Code 93 symbols are required to represent characters in 8-bit encoding standards. Equation (1) above is reduced to the following equation:

$$43(X)+(Y)=[8\text{-bit code in decimal}] \qquad (2)$$

where the variables X and Y are Code 93 characters with numeric values between 0 and 42.

Figure 10:
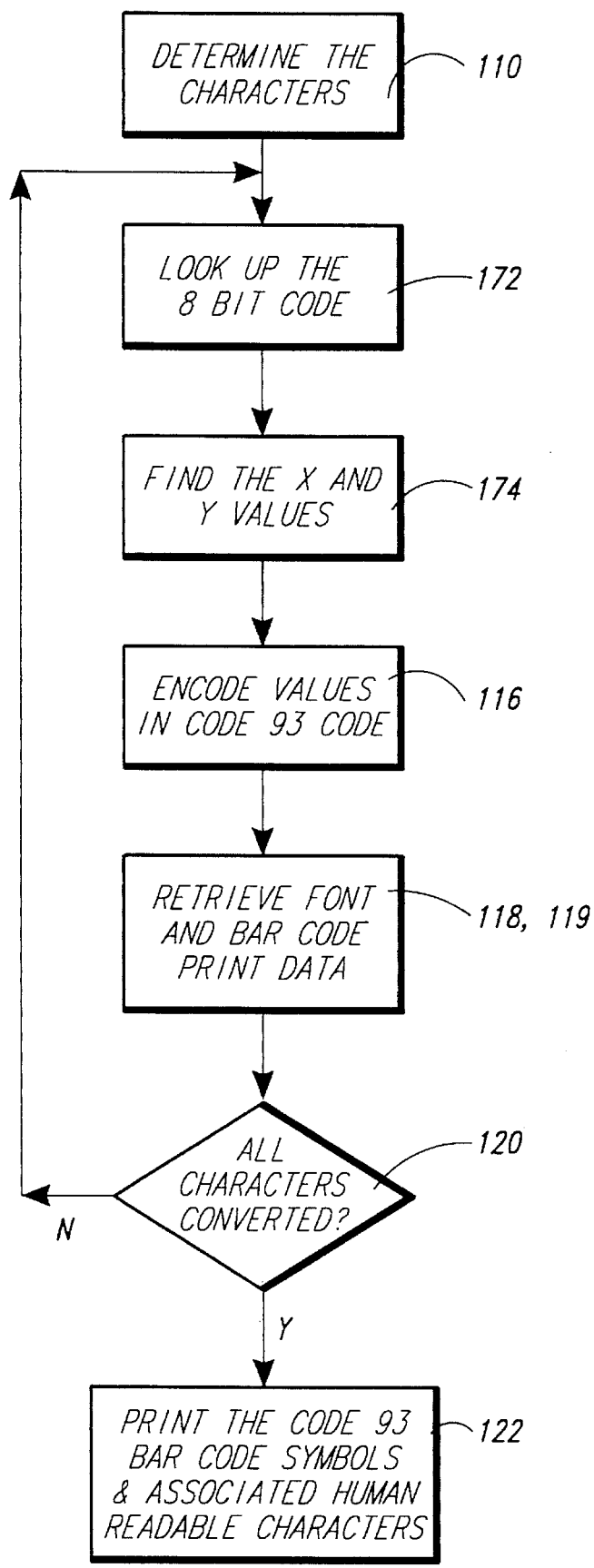
FIG. 10 is a flow chart showing the basic steps performed by the printing apparatus of FIG. 1 for printing bar code symbols representing 8-bit character codes.

FIG. 10 shows the steps necessary for encoding characters represented by 8-bit character encoding standards into Code 93 bar code symbols. The method shown in FIG. 10 is substantially similar to that shown in FIG. 2 and steps in FIG. 10 and for other alternative embodiments will be similarly numbered when requiting similar operations. Only the differences in the methods will be described in detail. As shown in FIG. 10, after a string of characters are determined in step 110, the 8-bit code for each character is determined in step 172. In step 174, the numeric values of the variables X and Y from equation (2) are calculated. Thereafter, the values are encoded into Code 93 codes (step 116), appropriate font and bar code print data is retrieved (steps 118 and 119), and the bar code symbols with characters are printed (step 122). Based on the detailed description of the present invention provided herein, those skilled in the art will recognize that the converse method may be employed for reading characters encoded under the steps shown in FIG. 10. Additionally, those skilled in the art will recognize that the bar code printing and reading apparatus 100 and 140 shown in FIGS. 1 and 5 may be adapted to print or read bar code symbols representing 8-bit characters based on the detailed description provided herein.

In a second alternative embodiment, a new bar code symbology is created to uniquely represent each 16-bit code by a bar code symbol. A symbology employing 20 modules and 5 bars (and spaces) per symbol may represent up to 92,378 characters. This (20,5) bar code symbology is adequate to represent the 65,536 16-bit codes in the Unicode character encoding standard. However, a bar code symbology having 21 modules and 6 bars and spaces per symbol is preferred. If this (21,6) symbology is used, and all bar code symbols having elements greater than six modules are eliminated, 163,592 characters may be represented. This number of characters is greater than two times the number of characters represented by Unicode. Such a large symbology allows for the use of parity codes. Additionally, as is known by those skilled in the art, the Hamming distance between bar code symbols may be maximized by eliminating all bar code symbols having a Hamming distance of one and using only those bar code symbols in the symbology which remain. Data security is thereby improved.

A maximum of six module width element is preferred because the print head on a thermal bar code symbol printer may become too hot when printing bars greater than six modules in width. Also, spaces greater than six modules may be interpreted by bar code symbol readers as the end of a symbol or label.

The new (21,6) symbology is created by generating the entire possible bar code symbol set representable by a (21,6) symbology. All bar code symbols having greater than 6-module width elements are eliminated. The remaining bar code symbols are ordered 1 through 65,536. Bar code codes 1 through 65,536 are assigned to the ordered bar code symbols. The bar code codes 1 through 65,536 map directly onto the Unicode codes.

equation (3) using known methods. In other words, the CPU 104 computes three numeric values between 0 and 46 for the variables X, Y, and Z in the above equations so as to represent the five-digit string. Thereafter, the CPU 104 encodes the numeric values of the variables X, Y, and Z into Code 93 codes (step 116), retrieves appropriate font and bar code data (steps 118 and 119), and prints the bar code symbols with the associated human-readable numbers (step 122).

Shown below as Table 1 is an example of converting a numeric string into bar code symbols. Table 1 below shows how the ten-digit numeric string "1234567890" is convened and printed by the printing apparatus 100 into a Code 93 bar code label similar to the label shown in FIG. 9.

TABLE 1

| Step 110 | Step 180 | Step 182 | Step 116 | | |
|---|---|---|---|---|---|
| The numeric string | Select five digits in string | Five digits in decimal = $47^2$ (X) + 47 (Y) + (Z) | Code 93 for X | Code 93 for Y | Code 93 for Z |
| 1234567890 | 12345 | 12,345 = $47^2$ (5) + 47 (27) + (31) | "5" value = 5 | "R" value = 27 | "V" value = 31 |
|  | 67890 | 67,890 = $47^2$ (30) + 47 (34) + (22) | "U" value = 30 | "Y" value = 34 | "M" value = 22 |

Figure 11:
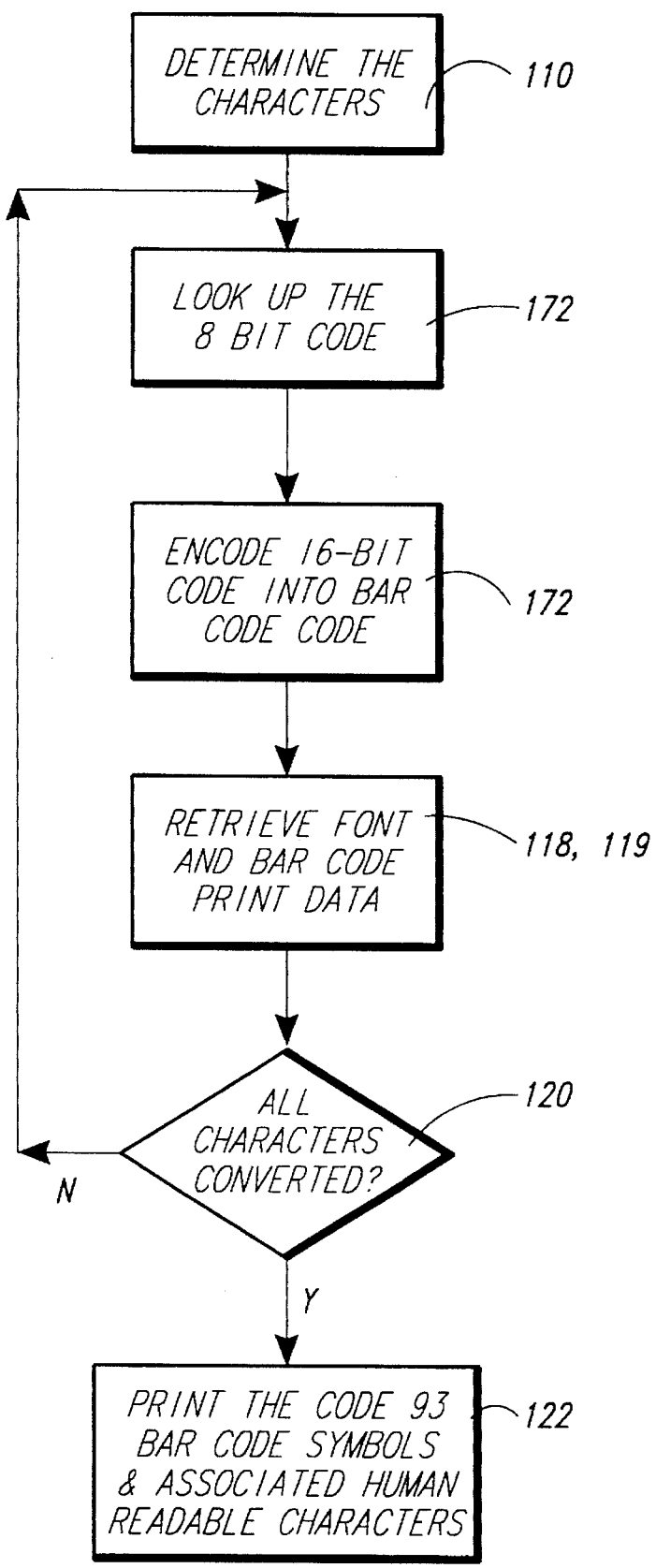
FIG. 11 is a flow chart showing the basic steps performed by the printing apparatus of FIG. 1 for printing bar code symbols each uniquely representing a 16-bit character code.

FIG. 11 shows the steps performed under the second alternative embodiment for printing a bar code label having both characters and bar code symbols, each bar code symbol representing one character. After a string of characters has been determined in step 110 and the 16-bit codes for these characters retrieved in step 112, the 16-bit codes are encoded into bar code codes in step 172. In step 172, the CPU 144 retrieves the unique bar code code in the (21,6) symbology representing the 16-bit code from a look-up table stored in either the memory 106 or the secondary storage 108. In steps 118 and 119, the font and bar code print data are retrieved based on the bar code code, and the bar code symbols with human-readable characters are printed on the bar code label in step 122.

In a third alternative embodiment, the present invention is adapted to efficiently encode numeric strings into standard bar code symbols. Only three Code 93 symbols are required to represent a numeric string containing five digits. The CPU 104, in the below-described steps, sequentially breaks a numeric string into five-digit groups and converts each group of five digits into three bar code codes, i.e., each five-digit string is converted into, and is thus represented by, three Code 93 codes. By using the Code 93 standard, a decimal number of over 100,000 can be represented by three Code 93 codes using the following equation:

$$47^2(X)+47(Y)+(Z)=\text{[5-digit decimal number]} \quad (3)$$

where the variables X, Y, and Z are numeric values between 0 and 46. Equation (3) will more than adequately represent a numeric string having five digits since equation (3) can represent a decimal number having more than five digits (specifically, a decimal number of up to 103,822).

Figure 12:
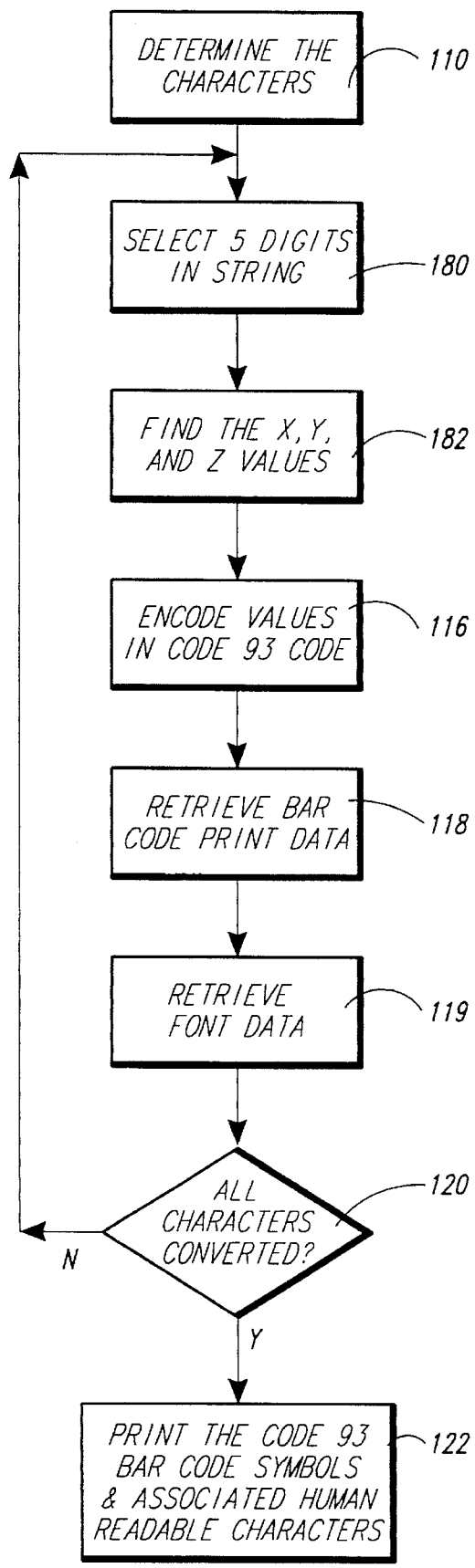
FIG. 12 is flow chart showing the basic steps performed by the printing apparatus of FIG. 1 for printing bar code symbols representing a numeric string.

FIG. 12 shows the steps performed by the printing apparatus 100 of FIG. 1 for printing a bar code label having both bar code symbols and human-readable characters representing a numeric string. The method shown in FIG. 12 is substantially similar to that shown in FIG. 2. For example, in step 110, a numeric string is selected or determined. The CPU 104, in step 180, selects five digits in the numeric string determined in step 110. In step 182, the CPU 104 solves Considering the first row in the above table, the CPU 104 selects the first five digits in the numeric string in step 180, i.e., the string "12345." In step 182, the CPU 104 solves the equation $47^2(X)+47(Y)+(Z)=12,345$, for the values of X, Y, and Z as follows:

$$12345/(47^2)=5 \text{ remainder } 1300$$

and $$1300/47=27 \text{ remainder } 31.$$

Therefore, the CPU 104 determines that the values for the three variables X, Y, and Z are 5, 27, and 31, respectively. In step 116, the CPU 104 converts these three numeric values to their corresponding Code 93 bar code codes. That is, 8 is converted to its corresponding bar code code of "8", 27 converted to its corresponding bar code code of "R", and 31 to its corresponding bar code code of "V" in the Code 93 character set. The CPU 104 determines the counts for printing the Code 93 bar code symbols for "8", "R" and "V" in step 118. The CPU 104 also determines the font data, in step 119, if the corresponding human-readable characters are to be printed. The steps 112–119 are repeated for the next five digits in the numeric string as is shown in the next row in Table 1, where the numeric string "67890" is converted into the bar code codes "UYM". Thereafter, the printer 102 prints the bar code symbols with the corresponding human-readable numbers for the numeric string in step 122.

A pair of shift codes are preferably used to identify a symbol encoded in high density numeric format. For example, the pair of bar code shift codes "⑦ ⑤" is preferably used to allow the bar code reading apparatus 140 to recognize that any subsequent bar code symbols are to be interpreted as a string of numeric digits. Therefore, the numeric string "1234567890", when encoded in Code 93 using the method shown in FIG. 12, results in the following string of bar code codes "⑦ ⑤ 5RVUYM" (ignoring the start, stop and check characters). Since two Code 93 shift codes are required to allow a reader to shift into the high density numeric mode under the third alternative embodiment, a numeric string of at least ten digits is required to gain a bar code density advantage over normal Code 93 numeric encoding. The same pair of shift codes, i.e., "$(I)$ $(S)$", is used again, following a string of symbols, to shift out of the high density numeric mode.

Figure 13:
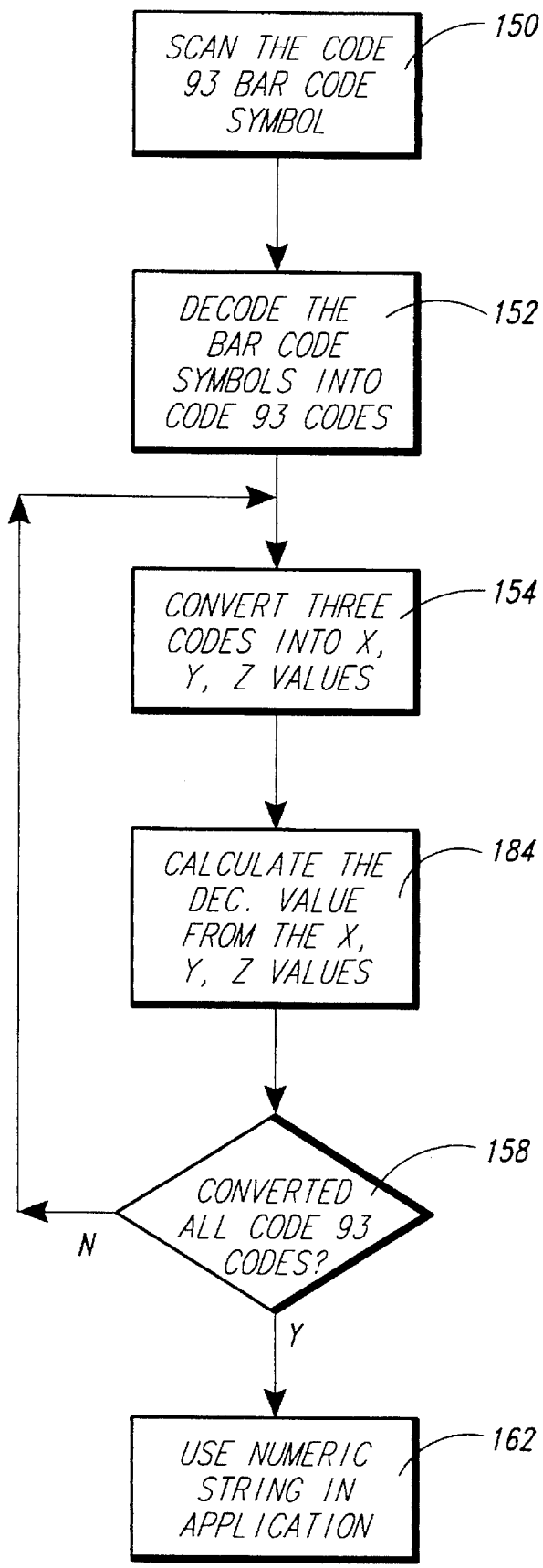
FIG. 13 is a flow chart showing the basic steps performed by the reading apparatus of FIG. 5 for reading bar code symbols representing numeric strings.

FIG. 13 shows the steps necessary for decoding a numeric string represented by Code 93 bar code symbols under the third alternative embodiment. The method shown in FIG. 13 is substantially similar to that shown in FIG. 6. In step 150, the bar code reading apparatus 140 scans the bar code symbols of a label and determines the series of counts. In step 152, the CPU 144 converts the bar code symbols into a string of bar code codes, i.e., the counts are converted into a string of Code 93 bar code codes. In step 154, the CPU 144 converts the first three Code 93 bar code codes into their corresponding three numeric values. In step 184, the CPU 144 converts this set of three numeric values into a decimal number based upon the equation (3) above, where the variables X, Y, and Z represent the three numeric values corresponding to the three bar code codes. For a given label having several bar code symbols, the first, second and third symbols scanned (following the start and shift codes) are converted into numeric values corresponding to the variables X, Y, and Z, respectively. In step 158, the CPU 144 determines whether all the Code 93 codes, in sets of three, have been converted into their decimal equivalent. If not, then the above steps are repeated, otherwise, in step 162, the numeric string is used in any number of applications.

Shown below as Table 2 is an example of converting a string of bar code symbols into a numeric string under the third alternative embodiment. In Table 2, six bar code symbols are read by the bar code reader apparatus 140 and converted into the numeric string "1234567890" under the steps of FIG. 13.

TABLE 2

| Steps 152, 154 | | | Steps 184 |
| --- | --- | --- | --- |
| Code 93 for X | Code 93 for Y | Code 93 for Z | 5 digits in decimal = $47^2$ (X) + 47 (Y) + (Z) |
| "5" Value = 5 | "R" Value = 27 | "V" Value = 31 | $47^2$ (5) + 47 (27) + (31) = 12,345 |
| "U" Value = 30 | "Y" Value = 34 | "M" Value = 22 | $47^2$ (30) + 47 (34) + (22) = 67,890 |

Referring to the first row in Table 2 above, the CPU 144 decodes the first three bar code symbols, following the start and shift code symbols, into three Code 93 bar code codes (step 152), and thereafter determines the numeric value for each of the bar code codes (step 154). The first bar code symbol has a bar code code representing the character "5", which corresponds to the numeric value 5 in the Code 93 standard. The second bar code code is decoded into the character "R", which corresponds to the numeric value 27. The third bar code code is decoded into the character "V", which corresponds to the numeric value 31.

In step 184, these three numeric values are input to the equation (3) where the first numeric value is the variable X, the second numeric value is the variable Y, and the third numeric value is the variable Z. For the first three numeric values shown in Table 2, the equation (3) becomes $47^2(5)$+ 47(27)+(31)=12,345. The steps in FIG. 13 are repeated for the next of three bar code codes (i.e., U, Y and M), which are convened to the numeric string 67890. The numeric string 1234567890 is then output for use in any appropriate application.

As noted above, when the bar code reading apparatus 140 scans a given series of bar code symbols and encounters the "$(I)$ $(S)$" pair of bar code shift codes, the apparatus switches into the high density numeric mode of operation to decode the subsequent bar code symbols into a string of numeric digits based on the steps of FIG. 13. As is known, the Code 93 symbology employs four shift characters "$(S)$", "$(\%)$", "$(I)$", and "$(+)$" which correspond to the numeric bar code codes 43, 44, 45 and 46, respectively. The "$(I)$" and "$(+)$" shift codes may be considered higher value shift codes, while the "$(S)$" and "$(\%)$" may be considered lower value shift codes. If the shift codes are paired with each other, the preceding shift code determines whether the pair is of higher or lower order. For example, the shift pair "$(I)$ $(S)$" is a higher order pair since the first shift code "$(I)$" is a higher order shift code.

Since the equation (3) need only represent five digits under the third alternative embodiment, no two higher order shift codes will occur in the first two positions of a high density numeric string. If two such higher order shift codes were in the first two of three positions at a high density numeric string, equation (3) would convert the three bar code codes into a decimal number having six digits. Therefore, the higher order shift code pairs may be used to shift into and out of certain reading and interpreting modes. The higher order shift code pair "$(I)$ $(\%)$" is used to switch into and out of the high density numerics mode. The higher order shift code pair "$(I)$ $(\%)$" may be used to switch the reading apparatus 140 into character sets defined by certain national associations or industry/data collection markets, such as Function 1. The lower order shift code pairs, i.e., "$(S)(\%)$", "$(S)(I)$", "$(S)(+)$", "$(\%)(S)$", "$(\%)(\%)$", "$(\%)(I)$", and "$(\%)(+)$" are then reserved for other functions, including entering and exiting the 16-bit and 8-bit character encoding methods as described above.

Those skilled in the art will recognize that the above-described invention provides an efficient means for encoding characters represented by 16-bit character codes or numeric strings into bar code symbols, and then converting those symbols back into characters or numeric strings. The above-described system supports the emerging 16-bit character encoding standards in the dam collection markets. Thus, the above-described system readily permits dam in computer formats to be converted to bar code formats and vice versa. Additionally, the above-described system allows long numeric strings to be efficiently and compactly represented by alphanumeric bar code symbologies.

Although specific embodiments of, and examples for, the present invention have been described for purposes of illustration, various modifications may be made without departing from the spirit and scope of the invention. For example, if the memory 106 or 146 is sufficiently large to contain all dam required by the CPU 104 or 144 for encoding, decoding, printing or reading bar code labels, the secondary storage 108 or 148 is unnecessary and thus eliminated. Alternatively, the data required by the CPU 104 or 144 may be contained in the secondary storage 108 or 148, thus eliminating the need for a large memory 106 or 146 or the need for this memory entirely. Furthermore, the printing apparatus 100 or the reading apparatus 140 may use only a limited character set. Only the data required by the CPU 104 or 144 representing this character subset is stored in the memory 106 or 146. The secondary storage 108 or 148 is unnecessary, and therefore be eliminated. These and other changes may be made to the invention in light of the derailed description provided herein, accordingly, the invention is not limited by the disclosure, but instead its scope is to be determined entirely by reference to the following claims.

We claim:

1. A method of converting a selected human readable character to machine readable symbols, each symbol having a pattern of dark shapes and light spaces between the shapes, the selected human readable character being represented by a character code having at least 16 bits, the method comprising the steps of:

selecting a single human readable character from a character set of human readable characters, the character set of having more than 6,400 human readable characters;

determining a selected character code having at least 16 bits for the selected human readable character, wherein each human readable character in the character set has a corresponding character code;

computing at least first, second and third values from the selected character code;

converting each of the first, second and third values into corresponding first, second and third symbol codes, the first, second and third symbol codes being selected from a symbol set of machine readable symbols, wherein each symbol in the symbol set has a corresponding symbol code, and wherein the character set is substantially larger than the symbol set; and printing first, second and third symbols corresponding to the first, second and third symbol codes, respectively.

2. The method of converting according to claim 1 wherein the character set of human readable characters in the Unicode standard, and wherein the selected character code is selected from the Unicode standard.

3. The method of converting according to claim 1 wherein the symbols are selected from the Code 93 standard.

4. The method of converting according to claim 3 wherein the step of computing at least first, second and third values from the selected character code is determined by solving the equation (the selected character code)=$43^2$ (X)+43 (Y)+(Z) for X, Y and Z, where X, Y and Z are the first, second and third values, respectively, to be computed from the selected character code.

5. The method of converting according to claim 1, further comprising the step of retrieving symbol print data required for printing the symbols prior to the step of printing the symbols.

6. The method of converting according to claim 1, further comprising the step of printing the selected human readable character with the printed symbols corresponding to the symbol codes.

7. The method of converting according to claim 6 wherein the character set of human readable characters is the JISC-6226-1983 standard, and wherein the selected character code is selected from the JISC-6226-1983 standard.

8. The method of converting according to claim 6, further comprising the step of retrieving font data required for printing the selected human readable character prior to printing of the selected human readable character with the symbols corresponding to the symbol codes.

9. The method of converting according to claim 6 wherein the character set of human readable characters is the Unicode standard, and wherein the selected character code is selected from the Unicode standard.

10. A method of converting a selected plurality of machine readable symbols to a character code having at least 16 bits, the machine readable symbols each having a pattern of dark shapes and light spaces between the shapes, the method comprising the steps of:

reading at least first, second and third symbols, the first, second and third symbols being selected from a symbol set of machine readable symbols, wherein each symbol in the symbol has a corresponding symbol code;

decoding the first, second and third symbols into corresponding first, second and third symbol codes, respectively;

converting the first, second and third symbol codes to at least first, second and third values, respectively; and computing a selected character code having at least 16 bits from the first, second and third values, respectively, the selected character code corresponding to a single human readable character, the character code and single human readable character being selected from a character set of human readable characters having more than 6,400 human readable characters and wherein the character set of human readable characters is substantially larger than the symbol set.

11. The method according to claim 10, further comprising the step of determining a human readable character from the selected character code.

12. The method according to claim 10 wherein the symbols are selected from the Code 93 standard.

13. The method according to claim 12 wherein the character set of human readable characters is the Unicode standard, and wherein the selected character code is selected from the Unicode standard.

14. The method according to claim 12 wherein the step of computing the selected character code is determined by solving the equation $43^2$ (X)+43 (Y)+(Z)=(the selected character code) for the selected character code, where X, Y, and Z are the first, second and third values, respectively.

15. The method according to claim 10 (wherein the charcter set of human readable characters is the Unicode standard, and wherein the selected character code is selected from the Unicode standard.

16. A method of converting a first selected human readable character to machine readable symbols, each symbol having a pattern of dark shapes and light spaces between the shapes, the first selected human readable character represented by a character code having at least 16 bits, the method comprising the steps of:

determining a first character code, having at least 16 bits, for the first selected human readable character, the first character and first character code being selected from a character set of human readable characters having more than 6,400 human readable characters, wherein each character in the character set has a corresponding character code;

computing a plurality of values from the first character code;

converting each of the plurality of values into a corresponding symbol code, the symbol codes being selected from a symbol set of machine readable symbols, wherein each symbol in the symbol set has a corresponding symbol code, and wherein the character set is substantially larger than the symbol; and printing a symbol corresponding to each of the symbol codes.

17. A method of converting a selected plurality of machine readable symbols to a character code having at least 16 bits, the symbols each having a pattern of dark shapes and light spaces between the shapes, the method comprising the steps of:

reading a selected plurality of symbols, the symbols being selected from a symbol set of machine readable symbols, wherein each symbol in the symbol set has a corresponding symbol code;

decoding the selected plurality of symbols into corresponding symbol codes;

converting the corresponding symbol codes to a plurality of values; and computing a selected character code having at least 16 bits from the plurality of values, the selected character code corresponding to a single selected human readable character, the selected character and character code being selected from a character set of human readable characters, wherein each character in the character set has a corresponding character code, and wherein the character set is substantially larger than the set of symbol set.

18. The method of claim 17, further comprising the steps of:

selecting at least a second human readable character;

converting the second human readable character into at least one corresponding symbol code; and printing another symbol corresponding to the at least one bar code code.

19. The method of claim 18 wherein the second human readable character can be represented by a second selected character code having 8 bits or less.

20. The method of claim 19, further comprising the step of printing a preceding symbol prior to the step of printing the symbol and following the step of printing the another symbol, the preceding symbol corresponding to at least one shift code.

* * * * *

UNITED STATES PATENT AND TRADEMARK OFFICE
CERTIFICATE OF CORRECTION

PATENT NO. : 5,557,092
DATED : September 17, 1996
INVENTOR(S) : Sprague Ackley and Stephen Choi It is certified that error appears in the above-indentified patent and that said Letters Patent is hereby corrected as shown below:

On the title page in field [75] denoting the Inventors, please delete "Sprague Ackley, Seattle; Stephen Choi, Kirkland," and replace with --Stephen Choi, Kirkland; Sprague Ackley, Seattle,--.

In column 15, claim 1, line 10, please delete "of".

In column 16, claim 10, line 2, following the first instance of "symbol" please insert --set--.

In column 16, claim 10, line 14, immediately following "characters" please insert --,--.

In column 16, claim 10, line 15, please delete "of human readable characters".

In column 16, claim 15, line 31, please delete "(".

In column 16, claim 16, line 55, following "symbol" please insert --set--.

In column 17, claim 17, line 12, please delete "set of".

Signed and Sealed this

Fifteenth Day of April, 1997

Attest:

BRUCE LEHMAN

*Attesting Officer*     *Commissioner of Patents and Trademarks*